US012269027B2

(12) United States Patent
Tesch et al.

(10) Patent No.: US 12,269,027 B2
(45) Date of Patent: Apr. 8, 2025

(54) PIPETTE WITH ADJUSTABLE DOSING VOLUME

(71) Applicant: Eppendorf AG, Hamburg (DE)

(72) Inventors: Florian Tesch, Hamburg (DE); Peter Molitor, Hamburg (DE)

(73) Assignee: Eppendorf AG, Hamburg (DE)

( * ) Notice: Subject to any disclaimer, the term of this patent is extended or adjusted under 35 U.S.C. 154(b) by 632 days.

(21) Appl. No.: 17/327,992

(22) Filed: May 24, 2021

(65) Prior Publication Data

US 2021/0362144 A1 Nov. 25, 2021

(30) Foreign Application Priority Data

May 25, 2020 (EP) .................................. 20 176 323

(51) Int. Cl.
*B01L 3/02* (2006.01)

(52) U.S. Cl.
CPC ....... *B01L 3/0224* (2013.01); *B01L 2200/148* (2013.01); *B01L 2300/026* (2013.01)

(58) Field of Classification Search
CPC ............................... B01L 3/021; B01L 3/0224
See application file for complete search history.

(56) References Cited

U.S. PATENT DOCUMENTS

| | | | | |
|---|---|---|---|---|
| 5,531,131 | A | 7/1996 | Sabloewski | |
| 8,133,453 | B2 | 3/2012 | Molitor | |
| 2007/0014696 | A1 * | 1/2007 | Molitor ................ | B01L 3/0224<br>422/400 |

FOREIGN PATENT DOCUMENTS

| | | | |
|---|---|---|---|
| DE | 4335863 | C1 | 2/1995 |
| DE | 102005033378 | A1 | 1/2007 |
| DE | 20321525 | U1 | 2/2008 |
| DE | 102012003846 | A1 | 8/2013 |
| DE | 102016121814 | A1 | 5/2018 |
| EP | 0649678 | B1 | 6/2001 |
| EP | 1743701 | A1 | 5/2006 |
| EP | 2470302 | | 7/2012 |
| EP | 2633915 | B1 | 9/2016 |
| WO | 2011/025399 | A2 | 3/2011 |

* cited by examiner

*Primary Examiner* — Christopher T Mui

(74) *Attorney, Agent, or Firm* — Barclay Damon LLP

(57) ABSTRACT

A pipette with an adjustable volume comprises a housing comprising an outside surface, at least one seat defining an opening, and a displacement apparatus defining a displacement chamber comprising a displacement element configured to be displaced therein. A stroke rod is coupled to the displacement element and configured to be displaced relative to the housing order to displace the displacement element. An adjusting apparatus is configured to adjust a position of an upper stop in the housing, a display apparatus is configured to display a set dosing volume, and a coupling apparatus is positioned between the adjusting apparatus and the display apparatus. The coupling apparatus is configured to couple the adjusting apparatus to the display apparatus in an engaged state and configured to uncouple the adjusting apparatus from the display apparatus in a disengaged state.

20 Claims, 8 Drawing Sheets

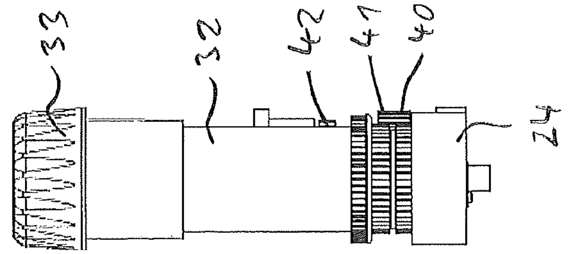
Fig. 3.4
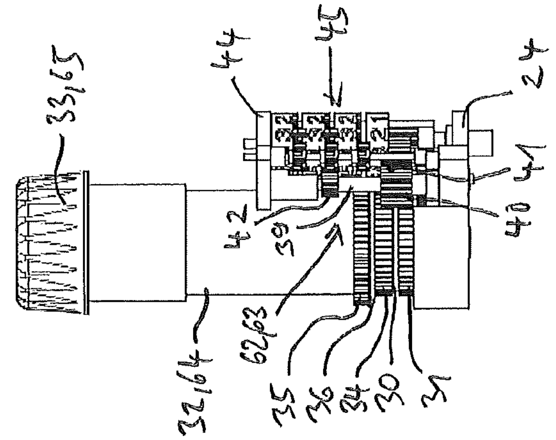
Fig. 3.3
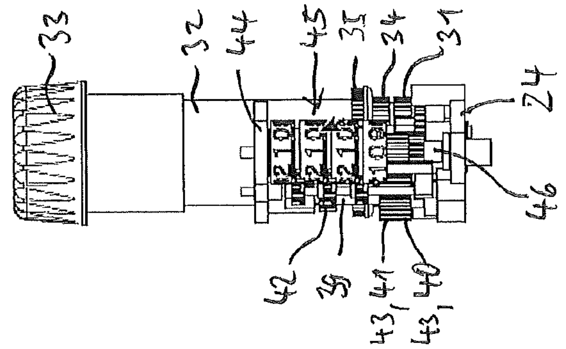
Fig. 3.2
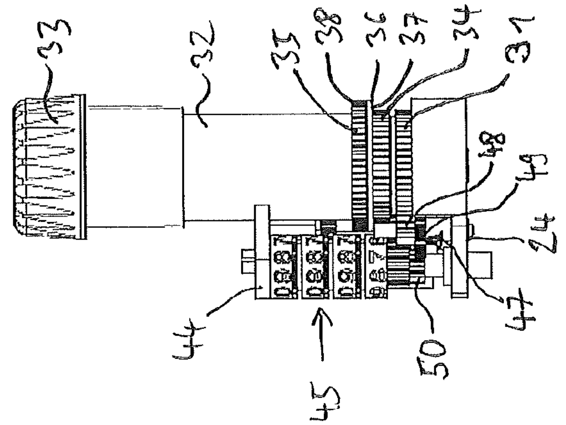
Fig. 3.1

Fig. 4.4
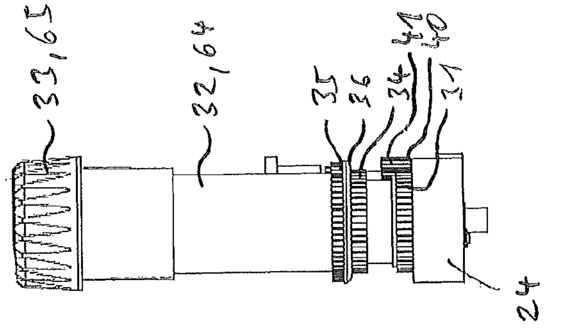
Fig. 4.3
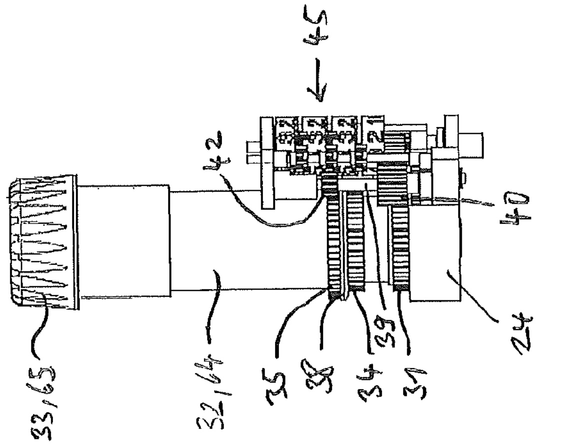
Fig. 4.2
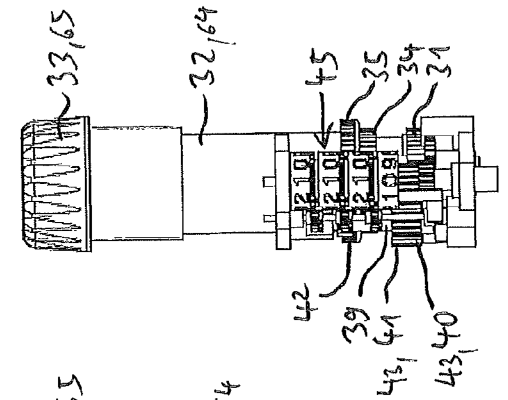
Fig. 4.1
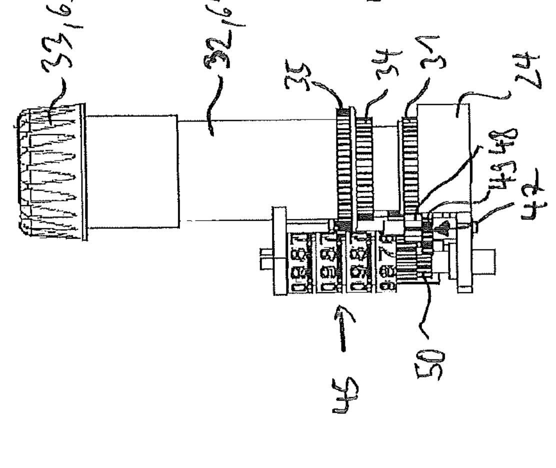

Fig. 5.4
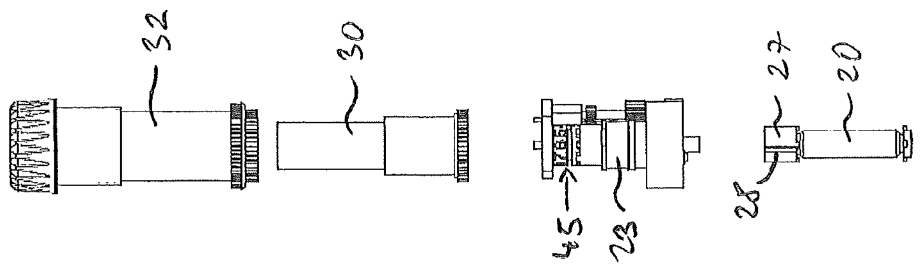
Fig. 5.3
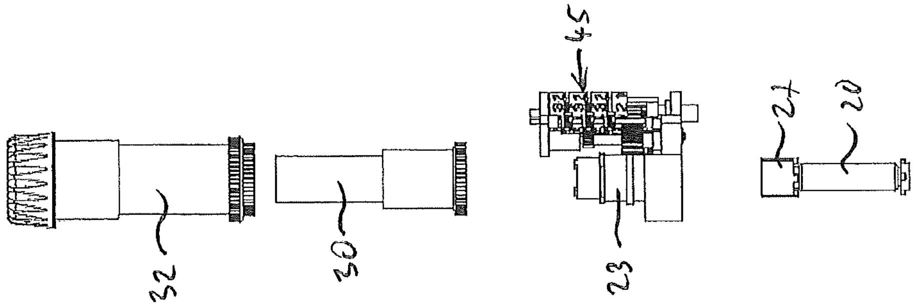
Fig. 5.2
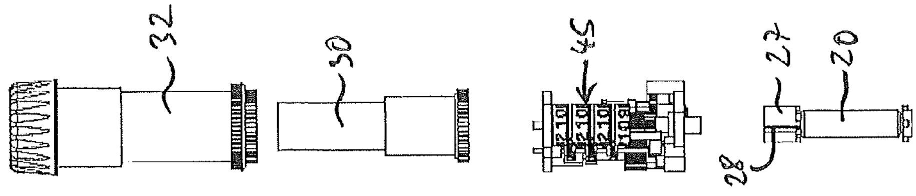
Fig. 5.1
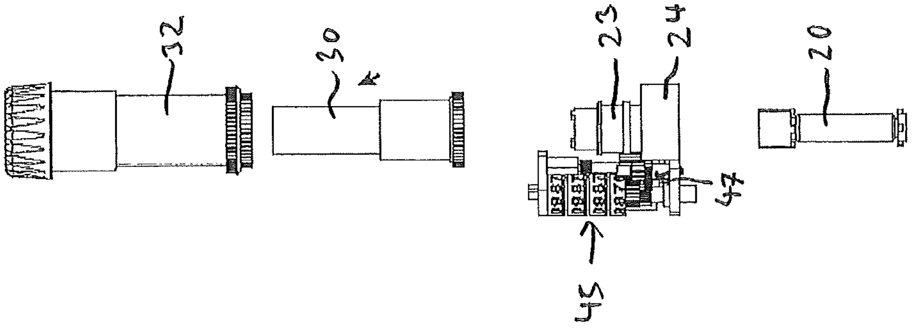

PIPETTE WITH ADJUSTABLE DOSING VOLUME

CROSS REFERENCE TO RELATED INVENTION

This application is based upon and claims priority to, under relevant sections of 35 U.S.C. § 119, European Patent Application No. 20 176 323.2, filed May 25, 2020, the entire contents of which are hereby incorporated by reference.

FIELD OF TECHNOLOGY

The invention relates to a pipette with an adjustable dosing volume.

BACKGROUND

Pipettes are used in particular in laboratories for dosing liquids. For this purpose, a pipette is clamped securely by its upper end onto a seat of the pipette. The seat is generally a conical or cylindrical projection relative to a housing of the pipette on which a pipette tip can be clamped with a top opening of its tubular body. The pipette tip can draw up and dispense liquid through a lower opening of its tubular body. Air displacement pipettes comprise a displacement apparatus for air that is connected to the pipette tip communicating through an opening in the seat. An air buffer is transferred by the displacement apparatus so that the liquid is aspirated into, and discharged out of the pipette tip. To accomplish this, the displacement apparatus has a displacement chamber with a displaceable displacement element. The displacement apparatus is typically a cylinder with a displaceable piston disposed therein.

After use, the pipette tip is detached from the seat, and exchanged for a fresh pipette tip. This can prevent contamination caused by transfer of liquid in subsequent dosings. Generally, pipettes have an ejection apparatus that allows pipette tips to be ejected by means of actuation of a button without the pipette tips being grasped. Single-use pipette tips generally consist of plastic.

The plunger is coupled to a drive apparatus that serves to move the plunger in the cylinder. The drive apparatus has a stroke rod that can be moved by a stop element between an upper and lower stop. At the beginning of the draw-in of air into the cylinder, the stop element is located on the lower stop. At the beginning of the displacement of air out of the cylinder, the stop element is located on the upper stop. The amount of drawn and released liquid depends on the stroke of the stroke rod between the upper and lower stop.

In fixed volume pipettes, the distance between the upper and lower stop is constant. In pipettes with an adjustable dosing volume, the position of the upper stop is changeable. Known pipettes have an upper stop on the bottom side of a threaded spindle that can be adjusted in a spindle nut arranged fixedly within the housing. To adjust the threaded spindle, adjusting apparatuses are available that are coupled to display apparatuses in the form of a counter for displaying the set dosing volume.

DE 43 35 863 C1, EP 0 649 678 B1 and U.S. Pat. No. 5,531,131 describe a pipette in which an actuating button projects out of the housing at the top and is connected to the upper end of a stroke rod that is connected at the bottom end to the plunger. The stroke rod is guided through passage channels in a threaded spindle and a lower stop. It has a stop in the form of an outwardly projecting bead that limits the movement of the stroke rod between the upper stop at the bottom of the threaded spindle and the lower stop. By pressing the actuating element against the force of a return spring, the plunger is moved deeper into the cylinder until the stop element lies against the lower stop. After releasing the actuating element, the plunger returns to its home position as a result of the effect of the return spring in which the stop element lies against the threaded spindle. Adjusting apparatuses for adjusting the threaded spindle have an adjusting sleeve that is rotatably mounted in the housing and that projects out of the housing at the top and in which the actuating button is axially displaceable. The adjusting sleeve is connected to rotate conjointly with the threaded spindle by axial grooves in its inner circumference and by catches that project radially from the upper end of the threaded spindle. By rotating the adjusting sleeve, the threaded spindle with the upper stop and hence the dosing volume can be adjusted. The adjusting sleeve has a spur gear on the lower end that is coupled in a form fit by coupling apparatuses to two coupling spur gears on a common shall to a spur gear of a counter. By means of shifting apparatuses, the shaft on which the two coupling spur gears are mounted can be displaced in order to disconnect coupling apparatuses. This allows the pipette to be calibrated at the factory. A disadvantage is that the calibration requires an iterative procedure, since the alignment of the upper stop by means of rotating the upper end of the adjusting sleeve is imprecise without a measurement of the respectively set stroke.

The above-mentioned documents describe an already known factory calibration, in which a slide coupling is moved between the adjusting apparatuses for the piston stroke and a counter. For this purpose, there is an opening in the pipette housing through which a screwdriver can be brought up to a slide coupling from a bevel gear set. By holding the volume setting and rotating the screwdriver or vice versa, the coupling between the volume setting and counter can be changed. The accuracy deviation produced by this (difference between the volume of liquid taken up and that displayed) can be checked by weighing a pipetted mass. A disadvantage is that this setting of the pipette correction factor is not particularly easy to access from the outside and is generally only used for factory setting or by the client in exceptional cases. Another disadvantage is that, when the counter is adjusted, a frictional connection element of the slide coupling always moves as well, and therefore the stroke system has to be secured such that it cannot move. Furthermore, the permanent frictional contact between the frictional connection elements results in not inconsiderable wear in the system.

DE 10 2005 033 378 B4, EP 1 743 701 B1 and U.S. Pat. No. 8,133,453 B2 describe a pipette of the above-described type which additionally has an adjusting apparatus for adjusting the position of a holder holding the lower stop relative to the cylinder and a display apparatus for displaying the position of the holder. This makes it easier for the user to change the calibration and recover the factory calibration.

DE 10 2012 003 846 B and EP 2 633 915 B1 describe a pipette in which the adjusting apparatus, in order to adjust the position of the lower stop, comprises a structure that manages with fewer components compared with the pipette described above, as a result of which the user can perform a calibration with better calibration accuracy.

BRIEF SUMMARY OF THE INVENTION

The object of the invention is to provide a pipette that simplifies calibration. An embodiment of a pipette according to the invention comprises a rod-shaped housing, at least one seat for releasably holding a pipette tip on the lower end of the housing, and a displacement apparatus comprising a displacement chamber having a displacement element displaceable therein. A connecting channel connects the displacement chamber to an opening in the seat and a stroke rod is coupled at the lower end to the displacement element and configured to be displaced in the longitudinal direction in the housing to displace the displacement element in the displacement chamber. A control button is connected to the upper end of the stroke rod and projects from the housing. A stop element is located on the outer circumference of the stroke rod, an upper stop for the stop element and a lower stop for the stop element are defined in order to limit the stroke of the stroke rod. An adjusting apparatus is configured to adjust the position of the upper stop in the housing. A display apparatus is configured to display a set dosing volume. A form-fit coupling apparatus is located between the adjusting apparatus and the display apparatus and is configured to couple the adjusting apparatus to the display apparatus in an engaged state and to uncouple the adjusting apparatus from the display apparatus in a disengaged state.

In an embodiment of the pipette, calibration in the factory, by the service department, and by the client is greatly facilitated. This is achieved in that the display apparatus can be moved in the disengaged state of the form-fit coupling apparatus without changing the stroke of the stroke rod set by means of the adjusting apparatus. By disengaging the form-fit coupling apparatus, the adjusting apparatus is separated from the display apparatus such that, by moving the display apparatus by means of the calibration apparatus, the position of the upper stop is not changed. Since the coupling apparatus between the adjusting apparatus and calibration apparatus is a form-fit coupling apparatus, it is ensured that a movement of the display apparatus cannot be transferred to the upper stop in the disengaged state. For this purpose, it is not necessary to secure the upper stop or stroke system by additional measures, such as by means of holding or blocking using a tool introduced from outside. In addition, there is no wear in the coupling apparatus during movement of the display apparatus. The calibration is facilitated that the display apparatus can be directly set to the result of a gravimetric measurement, as a result of which a significant time saving is achieved in relation to an iterative approach. Furthermore, the invention makes it possible to adjust the display apparatus and the position of the upper stop independently of one another. For this purpose, in the disengaged state of the coupling apparatus, the display apparatus can be moved and, independently hereof, the position of the upper stop can be changed using the adjusting apparatus.

According to an embodiment of the invention, the coupling apparatus is configured such that it can be uncoupled and coupled from the outside of the housing. This makes it possible to calibrate the pipette without having to open it or take it apart. However, the invention also relates to embodiments in which the coupling apparatus is configured such that it can only be coupled and uncoupled if the housing is open or if the pipette has been disassembled. For this purpose, the components of the pipette may for example be mounted on the housing and the housing may consist of a plurality of housing parts, some of which can be removed for the calibration, and/or some or all of the components of the pipette are mounted on a chassis (frame) of the pipette that an be removed from the housing for the calibration.

According to another embodiment, the coupling apparatus is configured such that it can be coupled and uncoupled by inserting a calibration tool in the housing from the outside of the housing. By using a calibration tool, the coupling and uncoupling of the coupling apparatus is facilitated and unintentional coupling and uncoupling is prevented. According to another embodiment, the coupling apparatus is coupled to a switch or other actuation apparatus that can be mechanically actuated from the outside of the housing, such that the coupling apparatus can be coupled and uncoupled by actuating the actuation apparatus.

According to another embodiment, the pipette comprises a calibration apparatus, which is configured to alter the setting of the display apparatus when the coupling apparatus is uncoupled. By means of the calibration apparatus, adjustment of the display apparatus is simplified. For this purpose, according to another embodiment, the calibration apparatus is configured such that the setting of the display apparatus can be changed from the outside of the housing in an alternative embodiment, the setting of the display apparatus can be changed in the disengaged state of the coupling apparatus by directly adjusting the display apparatus. This is possible, for example, if the display apparatus is configured as a (roller) counter. For this purpose, it may be possible, for example, to move a drive pinion or input roller of the (roller) counter by hand or using a tool. Preferably, for this purpose, the housing can be partially removed or a chassis having components of the pipette can be taken out of the housing.

According to another embodiment, the calibration apparatus is configured such that, when the coupling apparatus is uncoupled, the setting of the display apparatus can be changed by means of a calibration tool from the outside of the housing. As a result, adjustment of the display apparatus is simplified and prevented from happening unintentionally. In another embodiment, the calibration apparatus is coupled to an adjusting wheel or another adjusting member that can be moved from the outside of the housing, such that the display apparatus can be adjusted by moving the adjusting member from the outside of the housing.

According to another embodiment, the coupling apparatus and the calibration apparatus are configured such that, using the same calibration tool, the adjusting apparatus can be coupled to and uncoupled from the display apparatus and the setting of the display apparatus can be changed. According to another embodiment, for this purpose, the same calibration apparatus can be introduced into the housing from the outside of the housing through the same housing opening of the housing.

According to another embodiment, the coupling apparatus and calibration apparatus are configured such that, by inserting a calibration tool in the housing, the coupling apparatus can initially be uncoupled, and by then inserting the calibration tool further into the housing and then rotating the calibration tool the setting of the display apparatus can be changed. This further simplifies calibration of the pipette.

According to another embodiment, the form-fit coupling apparatus is a tooth coupling or claw coupling. According to another embodiment, the form-fit coupling apparatus comprises a first, driving gear that is coupled to the adjusting apparatus and that is mounted so as to be rotatable about an axis of rotation, a shaft that is mounted in a first bearing in the housing so as to be translationally displaceable in the direction of the axis of rotation and that bears the first gear, a second, driven gear of the display apparatus that meshes with the first gear, a cam mechanism having a first mechanism element that is borne by the shaft and a second mechanism element that is arranged in the housing in a stationary manner, and a rotary lever that is connected to the first mechanism element for conjoint rotation therewith. The first gear is held on the shaft so as to be prevented from shifting upward on the shaft and the first mechanism element is held on the shaft so as to be prevented from shilling downward on the shaft. By pivoting the rotary lever, the shaft can be translationally displaced via the cam mechanism and the first gear can be disengaged from the second gear in order to uncouple the adjusting apparatus from the display apparatus. This embodiment combines reliable function with easy operability.

According to another embodiment, the ends of the shall have a recess and/or a groove with a securing ring that is releasably held therein and the first gear is prevented from shifting upward on the shaft by means of a recess or a groove with a securing ring held therein and the first mechanism element is prevented from shifting downward by means of another recess or another groove with another securing ring held therein. According to another embodiment, the shaft is a rotatably mounted shaft and either the first gear is connected to the Shaft for conjoint rotation therewith and the first mechanism element and the rotary lever connected thereto for conjoint rotation therewith is mounted on the shaft so as to be rotatable about same or the first gear is mounted on the shaft so as to be rotatable about same and the first mechanism element and the rotary lever are connected to the shaft for conjoint rotation therewith. According to another embodiment, the rotary lever is accessible from the outside of the housing. The rotary lever may in particular be pivoted by means of a calibration tool or by hand. According to another embodiment, the rotary lever can be pivoted by introducing the calibration tool into an opening of the housing. In an embodiment, the first mechanism element is a first cam and/or the second mechanism element is a second cam. In, an alternative embodiment, only one of the two mechanism elements is a cam and the other mechanism element is a tracing element that traces the cam.

According to another embodiment, a first spring apparatus is arranged between the shaft and a counter-bearing arranged in a stationary manner in the housing, the first spring apparatus presses the shaft with the first gear into a position that meshes with the second gear, and the first gear can be disengaged from the second gear against the effect of the first spring apparatus. Preferably, the first spring apparatus is preloaded when the first gear meshes with the second gear. In this embodiment, when the coupling apparatus is uncoupled, the first spring apparatus is preloaded (further), such that, when the rotary lever is released, the first spring apparatus presses the shah into the position in which the first gear meshes with the second gear. The coupling apparatus is therefore engaged again automatically after the rotary lever is released, which further simplifies operation.

According to another embodiment, the calibration apparatus comprises a first, driving wheel that is mounted in a second bearing in the housing so as to be rotatable about arr axis of rotation and so as to be translationally displaceable in the direction of the axis of rotation and that can be translationally displaced until it contacts a second, driven wheel that is coupled to the display apparatus in order to rotate the second wheel by rotating the first wheel and in order to change the setting of the display apparatus. This makes it easier to adjust the display apparatus. According to another embodiment, the axis of rotation of the first wheel is oriented perpendicularly to the axis of rotation of the second wheel. According to another embodiment, the first wheel can be translationally displaced and rotated from the outside of the housing. This embodiment is particularly suitable for being combined with the above-mentioned form-fit coupling apparatus, which comprises a rotary lever that can be accessed from the outside of the housing.

According to another embodiment, the first wheel can be displaced up to the second wheel by means of a calibration tool placed on said first wheel and the first wheel can be rotated by rotating the calibration tool inserted in a tool engagement portion of the first wheel and the second wheel can be rotated by means of the first wheel.

According to another embodiment, the first wheel and the second wheel are friction wheels of a friction drive. According to another embodiment, the first wheel and the second wheel are gears, for example bevel gears having axes of rotation that are oriented perpendicularly to one another.

According to another embodiment, the first spring apparatus, via the shaft and the released rotary lever, pushes the first wheel away from the second wheel until it contacts the second bearing. As a result, when the rotary lever is released, the first wheel is automatically brought into a position in which it is not in contact with the second wheel.

According to another embodiment, a second spring apparatus is arranged between the first wheel and a second counter-bearing arranged in a stationary manner in the housing, the second spring apparatus pushes the first wheel away from the second wheel, and the first wheel can be displaced against the effect of the second spring apparatus until it contacts the second wheel. According to another embodiment, the second spring apparatus is preloaded when the first wheel has been pushed away from the second wheel until it has come into contact with a stop element. By displacing the first wheel until it contacts the second wheel, the second spring apparatus is preloaded (further), such that the first wheel automatically returns into its home position in contact with the stop element after release. This further simplifies operation.

According to another embodiment, the coupling apparatus and the calibration apparatus are configured to be actuated by means of a calibration tool, which comprises a shaft having a profile adapted to the tool engagement portion of the first wheel and a handle that is non-rotatably connected to the shaft, in order for the rotary lever to be pivoted by means of the shall being introduced into the opening of the housing, in order to enter a connection for conjoint rotation with the first wheel, to bring the first wheel into frictional connection with the second wheel by means of the shaft being inserted further in, and to rotate the second wheel by means of the first wheel by means of the calibration tool being rotated.

Another embodiment comprises an overstroke spring, via which the lower stop is supported, against being shifted downward by means of the stop element on the outer circumference of the stroke rod, on an overstroke spring bearing arranged in a stationary manner in the housing. As a result, an overstroke is enabled for blowing out residual sample liquid from the pipette tip by means of the displacement apparatus.

According to another embodiment, the pipette comprises a threaded spindle, on the lower end of which the upper stop is formed and which comprises a passage channel through which the stroke rod is guided. Arranging a threaded spindle with the upper stop on the lower end in a spindle nut produces an adjustable upper stop.

According to another embodiment, the adjusting apparatus comprises an adjusting sleeve that is rotatably mounted in the housing and that comprises an adjusting element that is accessible from the outside of the housing and that is coupled to the upper stop via a transmission. According to another embodiment, the transmission comprises axially extending grooves on the inner circumference of the adjusting sleeve in which the radial projections on the upper end of the threaded spindle engage. As a result, the threaded spindle can be easily advanced by rotating an end of the adjusting sleeve that protrudes upward from the housing. According to a preferred embodiment, the display apparatus is a (roller) counter.

Exemplary embodiments of such overstroke apparatuses, threaded spindles having spindle nuts, adjusting apparatuses, and display apparatuses are described in EP 0 649 678 B1, EP 1,743 701 B1 and EP 2 633 915 B1. In this regard, reference is made to the documents EP 0 649 678 B1, EP 1 743 701 B1 and EP 2 633 915 B1, the content of which is hereby incorporated by reference into the present application.

Finally, the invention relates to a set comprising a pipette and a calibration tool. The calibration tool comprises a shall having a profile adapted to the tool engagement portion of the first wheel and a handle that is non-rotatably connected to the shaft, in order for the rotary lever to be pivoted by means of the shaft being introduced into an opening of the housing, in order to enter a connection for conjoint rotation with the first, driving wheel, to bring the first wheel into frictional connection with the second wheel by means of the shaft being inserted further in, and to rotate the second wheel by means of the first wheel by means of the calibration tool being rotated.

BRIEF DESCRIPTION OF THE DRAWINGS

The invention is explained in the following in more detail based on an exemplary embodiment in the drawings, in which:

FIG. 3.1 illustrates a right perspective; view of an embodiment of an adjusting mechanism for an embodiment of the pipette;

FIG. 3.2 illustrates a front perspective view of the embodiment of the adjusting mechanism for the pipette of FIG. 3.1;

FIG. 3.3 illustrates a left perspective view of the embodiment of the adjusting mechanism for pipette of FIG. 3.1;

FIG. 3.4 illustrates a rear perspective view of the embodiment of the adjusting mechanism for pipette of FIG. 3.1;

FIG. 4,1 illustrates a right side perspective view of the embodiment of the adjusting mechanism of FIG. 3.1 in another shifting stage;

FIG. 4.2 illustrates a front perspective view of the embodiment of the adjusting mechanism of FIG. 4,1;

FIG. 4.3 illustrates a left side perspective view of the embodiment of the adjusting mechanism of FIG. 4.1;

FIG. 4.4 illustrates a rear perspective view of the embodiment of the adjusting mechanism of FIG. 4.1 in another shifting stage;

FIG. 5.1 illustrates an exploded right side view of the adjusting mechanism of FIG. 4.1;

FIG. 5.2 illustrates an exploded front view of the adjusting mechanism of FIG. 4.1;

FIG. 5.3 illustrates an exploded left side view of the adjusting mechanism of FIG. 4.1;

FIG. 5.4 illustrates an exploded rear view of the adjusting mechanism of FIG. 4.1;

DETAILED DESCRIPTION OF THE INVENTION

In the present application, the terms “top” and “bottom”, “above” and “below”, “plan view” and “bottom view” and terms derived therefrom such as “bottom side” and “top side” and “horizontal” and “vertical” relate to an alignment of the pipette in which the housing with the seat is aligned vertically downward. In this alignment, a pipette tip attached to the seat can be directed at a vessel located beneath it, in order to draw, or respectively dispense liquid.

Figure 1:
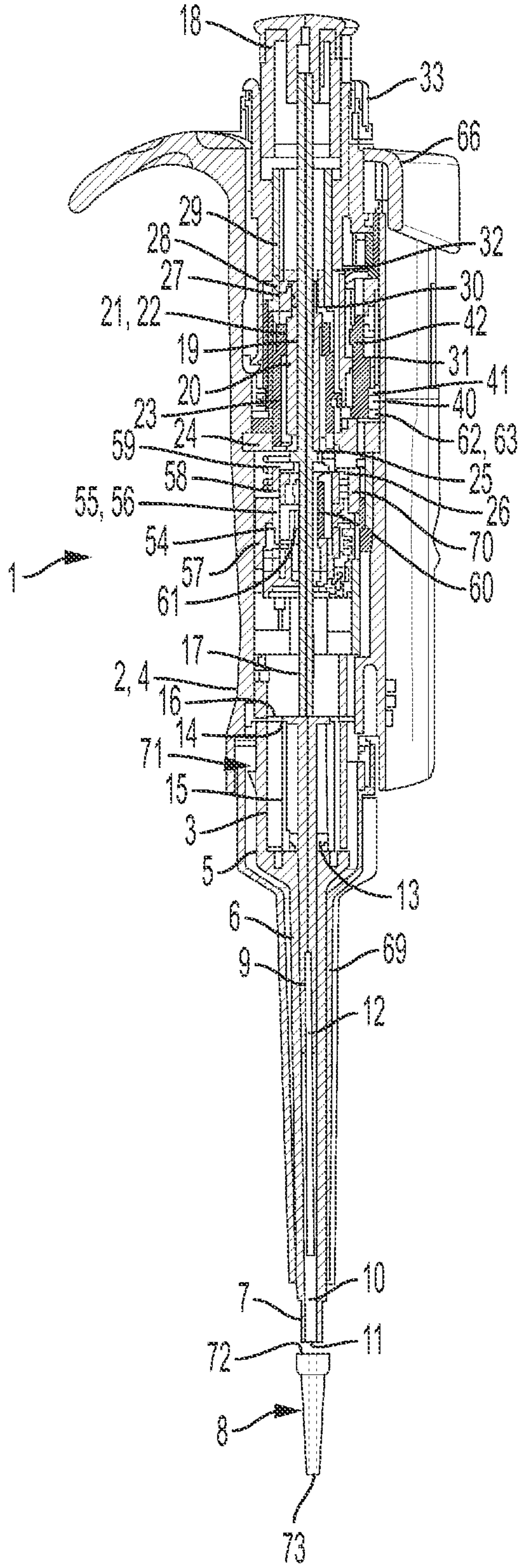
FIG. 1 illustrates a sectional view of an embodiment of a pipette.
Figure 2:
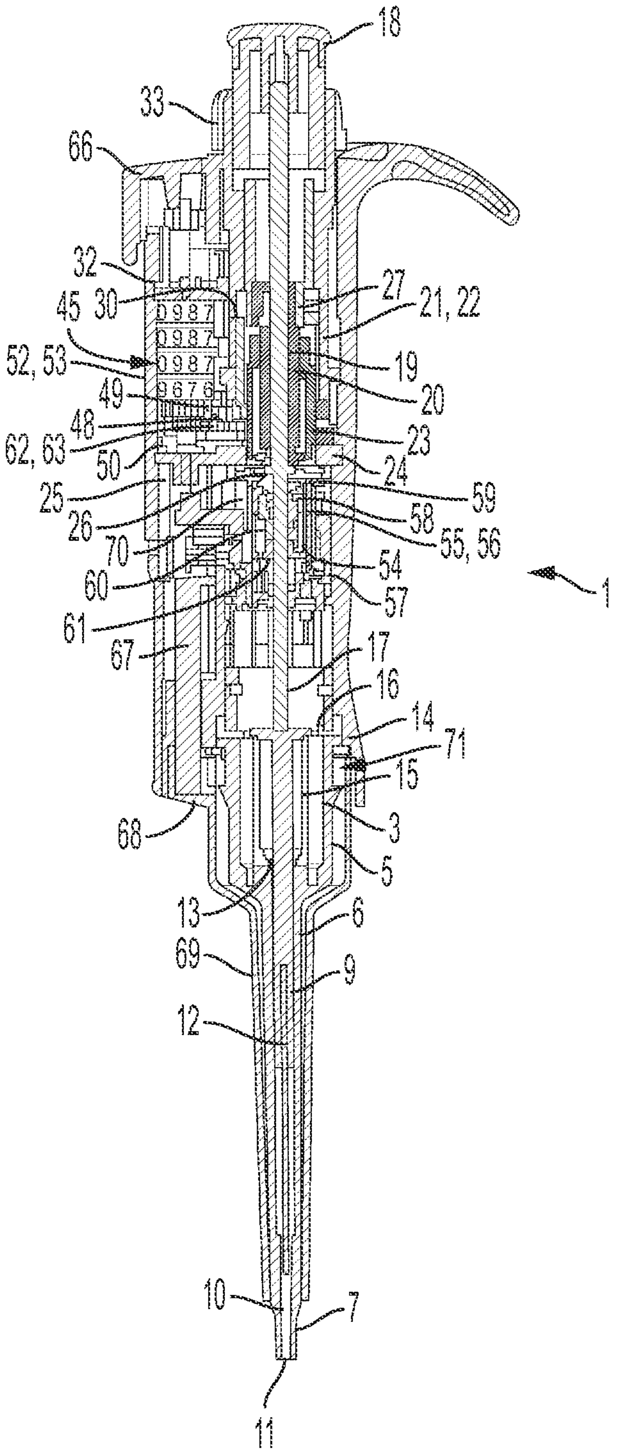
FIG. 2 illustrates another sectional view of an embodiment of a pipette.

According to FIGS. 1 and 2, a pipette 1 according to the invention has a rod-shaped housing 2 with a bottom housing part 3 and a top housing part 4. At the top, the bottom housing part 3 has a tubular main body 5 with a conical floor front which a slim, tubular, slightly conical attachment 6 projects downward that has a seat 7 at the bottom for mounting a pipette tip 8. In the attachment 6, a displacement chamber 9 is formed in the form of a cylinder that is connected by a connecting channel 10 to an opening 11 in the bottom side of the seat 7.

Furthermore, the bottom housing part 3 comprises a displacement element 12 in the form of a plunger of the displacement apparatus that is guided by a seal system 13 at the top side of the floor into the cylinder 11. The displacement element 12 has a plate 14 at the upper end that has a central dome-shaped recess in the top side. A first spring apparatus 15 is arranged in the form of a helical spring between the plate 14 and the top side of the floor. The first spring apparatus 15 presses the plate 14 from below against a sealing cap 16 that is connected to the main body 5 and has a passage in the center through which the plate 14 is accessible from above.

The top housing part 4 contains a stroke rod 17 that lies against the top side of the plate 14. The lower end of the stroke rod 17 engages in the recess in the plate 14. A control button 18 is fixed at the top to the stroke rod 17 and projects from the upper end of the housing 2 to the outside.

The stroke rod 17 is guided through a central spindle hole 19 in a threaded spindle 20 that is arranged in the top housing part 4. The threaded spindle 20 has an outer thread 21 on the outside that can be screwed into an inner thread 22 of a stroke body 23 that is held at the bottom on a first carrier 24 in the top housing part 4. The stroke body 23 forms a spindle nut.

The lower face of the threaded spindle 20 is an upper stop 25 for a stop element 26 in the form of an annular bead on the outer circumference of the stroke rod 17.

The threaded spindle 20 is connected at the upper end to rotate conjointly with a catch 27 that engages by means of ribs 28 projecting radially outward (see FIGS. 5.2 and 5.4)

into axial grooves 29 of a catch sleeve 30. The catch sleeve 30 is arranged concentrically to the threaded spindle 20 and is rotatably mounted on the outer circumference of the stroke body 23. The catch sleeve 30 has a circumferential first toothing 31 on the bottom edge on the outer circumference. This is shown in particular in FIGS. 3.1 to 5.4.

An adjusting sleeve 32 is shoved onto the catch sleeve 30. The adjusting sleeve 32 is rotatably mounted on the outer circumference of the catch sleeve 30 and is displaceably guided in an axial direction between two barriers on the catch sleeve 30. The upper end of the adjusting sleeve 32 projects outward from the upper end of the housing 2. There, the adjusting sleeve 32 has an adjusting ring 33 on the outer circumference which bears a corrugation on the outer circumference.

The adjusting sleeve 32 has a second toothing 34 surrounding the outer circumference on the lower edge, and a third toothing 35 somewhat further up surrounding the outer circumference. The first toothing 31 and the second toothing 34 have the same diameter and the same number of teeth. The third toothing 35 has a greater diameter and a greater number of teeth than the second toothing 34.

The second toothing 34 is closed on the top side and the third toothing 35 is closed on the bottom side by an intermediate disc 36. The bottom side of the disc 36 forms a lower barrier 37 and the top side of the disc 36 forms an upper barrier 38 for the displacement of the adjusting sleeve P.

On the first support 24, a transmitter shaft 39 is rotatably mounted adjacent to the catch sleeve 30 and the adjusting sleeve 32. The transmitter shaft 39 is provided at the bottom with a fourth toothing 40, above that with a fifth toothing 41, and above that with a sixth toothing 42. The fourth toothing 40 and fifth toothing 41 have the same diameter and the same number of teeth and are combined into a single toothing 43. The sixth toothing 42 is arranged at a distance from the fifth toothing 41. It has a smaller diameter and a lesser number of teeth than the fifth toothing 41. The transmitter shaft 39 is rotatably mounted at the top in a second carrier 44 that is fixed in the top housing part 4.

Moreover, a counter 45 in the form of a roller counter is held between the first carrier 24 and the second carrier 44. A counter roller shaft 46 of the roller counter is mounted at the bottom in the first carrier 24 and at the top in the second carrier 44. At the top, the second carrier 44 abuts a projection in the housing. Additionally, a drive gear 47 is rotatably mounted on a shaft on the first carrier 24, which drive gear comprises two spur gears 48, 49 that are interconnected for conjoint rotation and that have different diameters. The spur gear 48 with the smaller diameter meshes with the first soothing 31 of the catch sleeve 30, and the spur gear 49 with the larger diameter meshes with a drive pinion 50 on an initial roller of the roller counter.

The spur gear 49 and the shaft are components of a form-fit coupling apparatus, which is explained further below. The number wheels 51 of the counter 45 are visible from the outside of the housing 2 through a window 52 in the top housing part 4 that has a transparent cover 53 (FIG. 2). In the top housing pan 4, a pot-shaped holder 54 is arranged below the stroke body 23. The holder 54 has an outer thread 55 that is screwed into an inner thread 56 of a third carrier 57 fastened within the housing 2.

The holder 54 contains a cap-shaped lower stop 58 that is held below a downwardly-bent upper edge 59 of the holder 54. An overstroke spring 60 in the form of a helical spring that abuts the floor 61 of the holder 54 presses the lower stop 58 against the upper edge 59. The stroke rod 17 is guided through central passages in the lower stop 58, through the overstroke spring 60 and a central passage in the floor 61 of the holder 54.

The adjusting sleeve 32 is a driving shaft, the catch sleeve 30 is a driven shaft, and the transmitter shaft 39 is a countershaft of a gearbox 63 designed as a spur gearbox 62. Shilling between the various stages is accomplished by axially moving the adjusting sleeve 32 into a lower shill position (fine adjustment position) shown in FIGS. 3 and 4, and into an upper shift position (quick adjustment position) shown in FIG. 4. In the fine adjustment position in FIG. 3, the adjusting sleeve 32 is moved downward as far as possible until it contacts the lower barrier 37 on the top side of the fifth toothing 41, and in the quick adjustment position, the adjusting sleeve 32 is moved upward until it contacts the upper barrier 38 on the bottom side of the sixth toothing 42. The adjusting sleeve 32 is therefore simultaneously a shifting apparatus 64 of the gearbox, wherein the adjusting ring 33 is a shift element 65 of the shifting apparatus 64.

In the exemplary embodiment, the gearbox 63 does not have any preferential position so that the gearbox always retains the most recently set shifting stage. The invention includes other types of embodiments with a preferential position of the gearbox that for example are realized by means of a second spring apparatus.

When the adjusting sleeve 32 is rotated, the catch sleeve 30 is also rotated in accordance with the set shifting stage. By means of the catch sleeve 30, the threaded spindle 20 is screwed into the inner thread 22 fixed relative to the housing, and the upper stop 25 travels up or down depending on the rotational direction. This shifts the distance between the upper stop 25 and the lower stop 58 that determines the dosing volume. The set dosing volume can be read from the counter 45, which is driven via the drive gear 47 by the catch sleeve 30.

An ejector button 66 on an ejector rod 67 is seated next to the adjusting sleeve 32 at the top edge region of the top housing part 4. The ejector rod 67 runs parallel to the stroke rod 17 through the top housing part 4, Its bottom is connected to a lateral fastening shoulder 68 of an ejector sleeve 69 that is movably arranged on the attachment 6. An ejector spring 70 configured as a helical spring is arranged in the top housing part 4, and one end is braced within the housing 2 and the other end contacts the ejector rod 67. The ejector spring 70 presses the ejector rod 67 upward so that the ejector sleeve 67 lies against the attachment 6. The bottom housing part 3 and the top housing part 4 are connected to each other by a snap connection 71.

Before pipetting, the user can adjust the desired dosing volume. To accomplish this, he or she rotates the adjusting ring 33 until the desired dosing volume is displayed by the counter 45. To adjust the dosing volume, the user can choose between two speed levels. In particular when the most recently set dosing volume deviates significantly from the dosing volume to be set, the user can first select a quick shifting stage if the gearbox is not already set to the quick shifting stage, the user grasps the adjusting ring 33 and pulls the adjusting sleeve 32 out of the fine adjustment position in FIGS. 3.1 to 3.4 a bit more out of the housing 2 into the quick adjustment position shown in FIGS. 4.1 to 4.4.

In the first quick adjustment position, the first toothing 31 of the catch sleeve 30 engages with the fourth toothing 40 of the transmitter shaft 39, and the third toothing 35 of the adjusting sleeve 32 engages with the sixth toothing 42 of the transmitter shaft 39. This converts the rotational speed of the adjusting sleeve 32 into a higher rotational speed of the catch sleeve 30 so that the user can quickly adjust the dosing volume close to the dosing volume to be set.

To precisely set the desired dosing volume, the user can choose a slow shifting stage. To accomplish this, he or she presses the adjusting sleeve 32 on the adjusting ring 33 lower into the housing 2 into the fine adjustment position shown in FIG. 3. In this position, the first toothing 31 engages with the fourth toothing 40, and the second toothing 34 engages with the fifth toothing 41. Consequently, rotating the adjusting sleeve 32 at a certain rotational speed causes the catch sleeve 30 to rotate at a slower speed than in the quick shifting stage. With the toothings of the exemplary embodiment, the rotational speed of the adjusting sleeve 32 is the same as the rotational speed of the catch sleeve 30, since the first toothing 31 and the second toothing 34 as well as the fourth toothing 40 and the fifth toothing 41, each have corresponding numbers of teeth and diameters.

Before or alter precisely setting the dosing volume, the user can clamp a pipette tip 8 onto the pipette 1 by pressing the pipette 1 by the seat 7 into the top opening 72 in the pipette tip 8. For pipetting, he or she first presses the control button 18 downward so that the stop element 26 is displaced by the upper stop 25 against the lower stop 58. In so doing, the stroke rod 17 presses the displacement element 12 downward, and the first spring apparatus 15 is preloaded. Then the user immerses the pipette tip 8 by its bottom opening 73 into the sample fluid and releases the control button 18. Consequently, the first spring element 15 presses the displacement element 12 and the stroke rod 17 upward until the stop element 26 lies against the upper stop 25. In so doing, a quantity of liquid that corresponds to the set dosing volume is drawn into the pipette tip 8.

To discharge the quantity of liquid, the user holds the pipette tip 8 with the bottom opening 73 over another vessel and presses the control button 18 downward again. After the lower stop 58 is reached, he or she can press the control button 18 deeper in while overcoming the resistance of the overstroke spring 60 in order to eject a residual quantity of liquid from the pipette tip 8.

Then he or she can pipette an additional quantity of liquid in the same manner or, to change the sample liquid, the pipette tip 8 is ejected downward by pressing the ejector button 66. In so doing, the ejector sleeve 69 scrapes the pipette tip 8 off of the seat 7. After the ejector button 66 is released, the ejector spring 70 displaces the ejector rod 67 back to the shown home position. Then additional pipettings can be carried out with the same set dosing volume, or with new dosing volume to be set, wherein the adjustment can be performed as described above.

The coupling apparatus 74 and the calibration apparatus 75, which were left out of FIGS. 1 to 5 for simplification reasons, are explained in greater detail n the following based on FIGS. 6 to 12. The coupling apparatus 74 comprises the shaft 76 on which the two spur gears 48, 49 are mounted so as to be rotatable about an axis of rotation 77. The shalt 76 is mounted in a first bearing 78 formed in the first carrier 24 and in the second carrier 44 so as to be translationally displaceable in the direction of the axis of rotation 77. The spur gear 49 with the larger diameter is connected to the spur gear 71 with the smaller diameter for conjoint rotation therewith and forms a first, driving gear 79 of the coupling apparatus 74. The drive pinion 50 that meshes with the spur gear 49 tiaras a second, driven gear 80 for driving the counter 45.

Furthermore, the coupling apparatus 74 comprises a cam mechanism 81, which comprises a first mechanism element 82 in the form of a first cam 83 that is rotatably mounted on the shaft 76 and a second mechanism element 84 in the form of a second cam 85 that is formed in a stationary manner in the housing 7 on the bottom side of the first carrier 24.

The first mechanism element 82 is connected at the bottom to a rotary lever 86 for conjoint rotation therewith, which rotary lever comprises a cam-shaped end 87. A first spring apparatus 88 in the form of a helical spring 89 that is guided on the shall 76 abuts the first carrier 24 at the bottom and the bottom side of the spur gear 49 at the top. The first carrier 24 forms a counter bearing 90 for the first spring apparatus 88. The first spring apparatus 88 presses the spur gear 49 into a position in which it meshes with the drive pinion 50 (cf. FIG. 6). The spur gear 49 can be disengaged from the drive pinion 50 by moving the shall 76 downward against the effect of the first spring apparatus 88.

The calibration apparatus 75 comprises a second bearing 91 in the form of a bearing body 92, which has a U-shaped cross-section in a horizontal section and comprises a circular first through-hole 93 in the base 94. The bearing body 92 is attached on the side of the first carrier 24. A first wheel 95 of the calibration apparatus 75 is mounted in the bearing body 92 so as to be rotatable and axially displaceable. The first wheel 95 comprises a protruding hollow cylinder 96 on the outside that is mounted in the first through-hole 93 of the bearing body 92 so as to be rotatable and translationally displaceable and that protrudes outward from the outside of the bearing body 92. A tool engagement portion 97 is formed in the hollow cylinder 96. The tool engagement portion 97 has the shape of a circular second through-hole 98 having a circumferential portion in the shape of a chord of a circle. The first wheel 95 is a first friction wheel 99 of a friction drive 100 and consists, for example, of a metal or a plastic.

Furthermore, the calibration apparatus 75 comprises a second wheel 101, which is connected to the initial roller of the counter 45 for conjoint rotation therewith below the number wheels 51. The second wheel 101 is a second friction wheel 102 of the friction drive 100. It is formed, for example, by a ring consisting of rubber. The housing 2 of the pipette 1 comprises a housing opening 103 that is centrally aligned with the first and second through-holes 93, 98.

A calibration tool 104 comprises a shaft 105 having a profile that is adapted to the tool engagement portion 97 of the first wheel 95. For this purpose, in a cross-section through the shaft 105, the shaft 105 has a circular profile with a portion in the shape of a chord of a circle. A handle 106 is connected to the outer end of the shaft 105.

Figure 8:
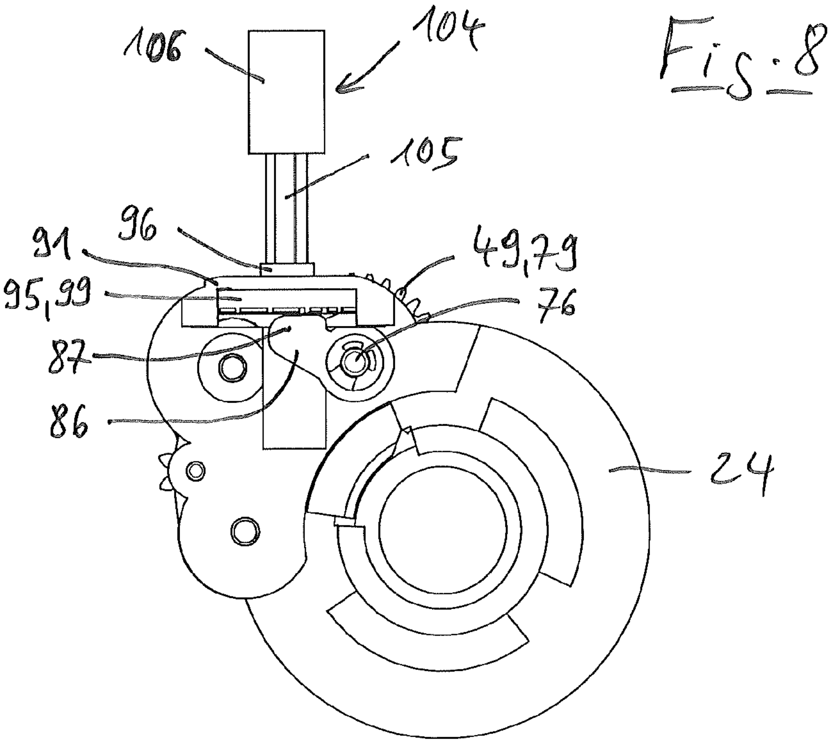
FIG. 8 illustrates a bottom view of an embodiment of the adjusting assembly with a calibration tool.

FIG. 8 shows the calibration tool prior to insertion in the pipette 1. The spur gear 49 meshes with the drive pinion 50 and the shaft 76 is shifted upward as far as possible and held in this arrangement by means of the first spring apparatus 88. The rotary lever 86 is rotated by means of the cam mechanism 81 into a position in which it presses against the inside of the first wheel 95 and said first wheel presses against the inside of the base 94 of the bearing, body 92.

Figure 6:
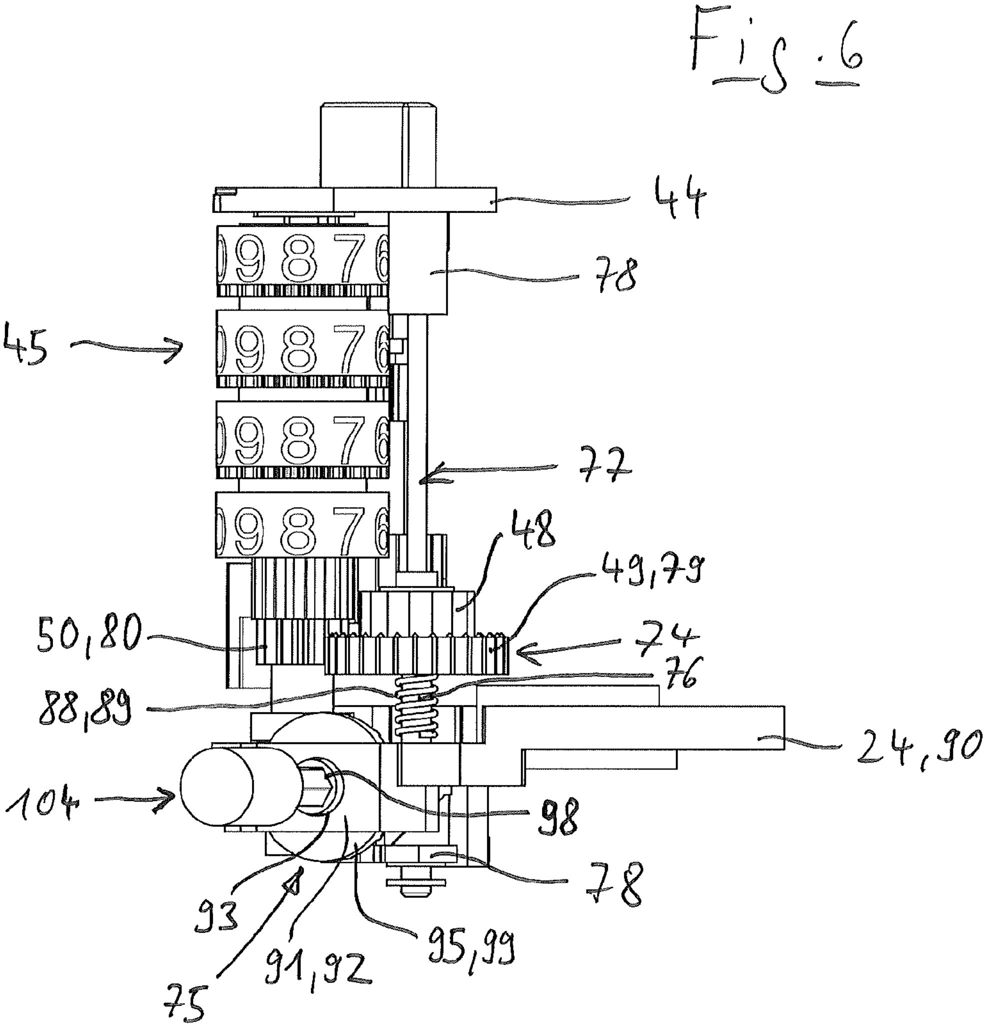
FIG. 6 illustrates a close-up perspective view of an embodiment of the adjusting assembly.
Figure 7:
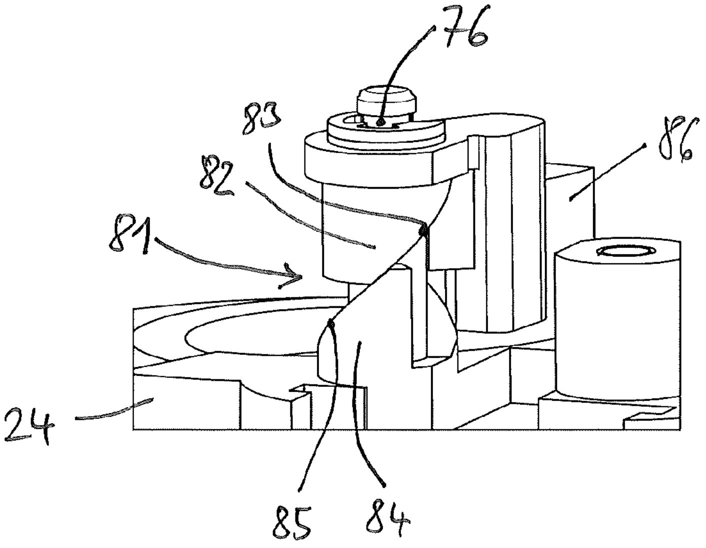
FIG. 7 illustrates a close-app view of an embodiment of a cam mechanism of the embodiment of the adjusting assembly.
Figure 9:
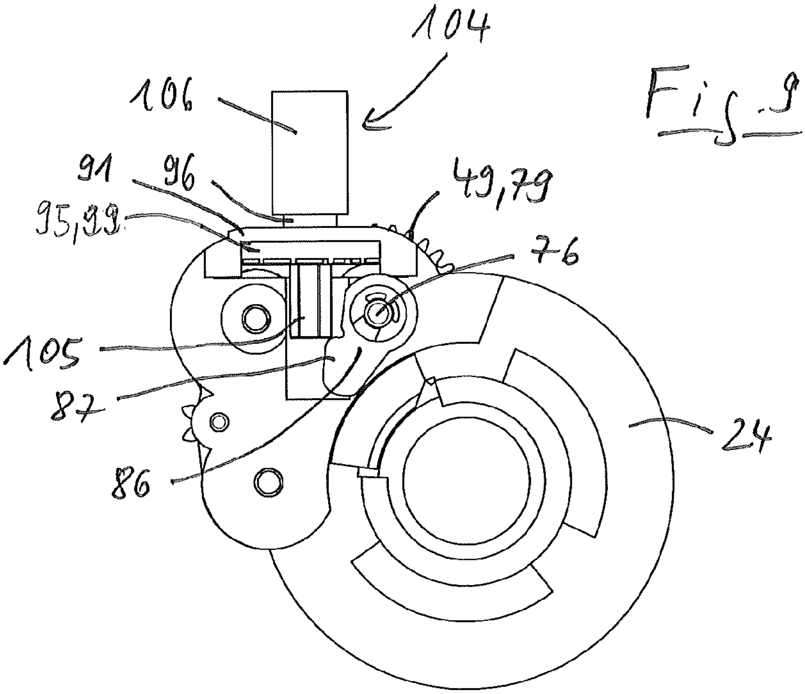
FIG. 9 illustrates a bottom view of an embodiment of the adjusting assembly with the calibration tool partially inserted for uncoupling the coupling apparatus.
Figure 10:
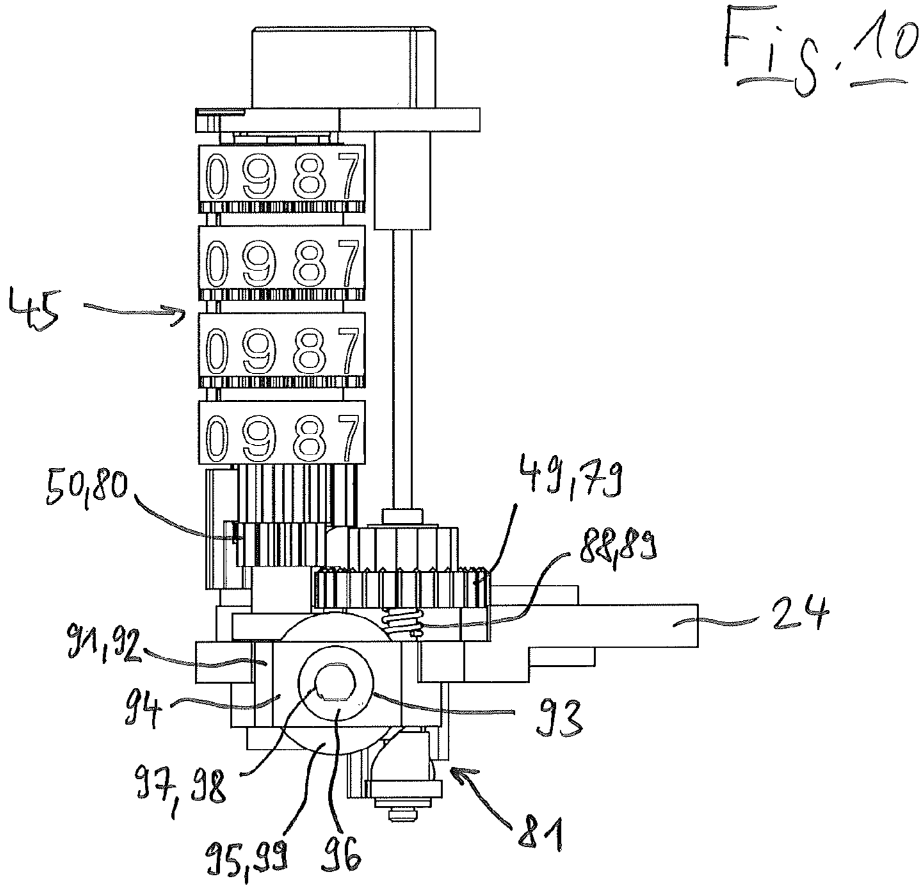
FIG. 10 illustrates a front view of the embodiment of FIG. 9.
Figure 11:
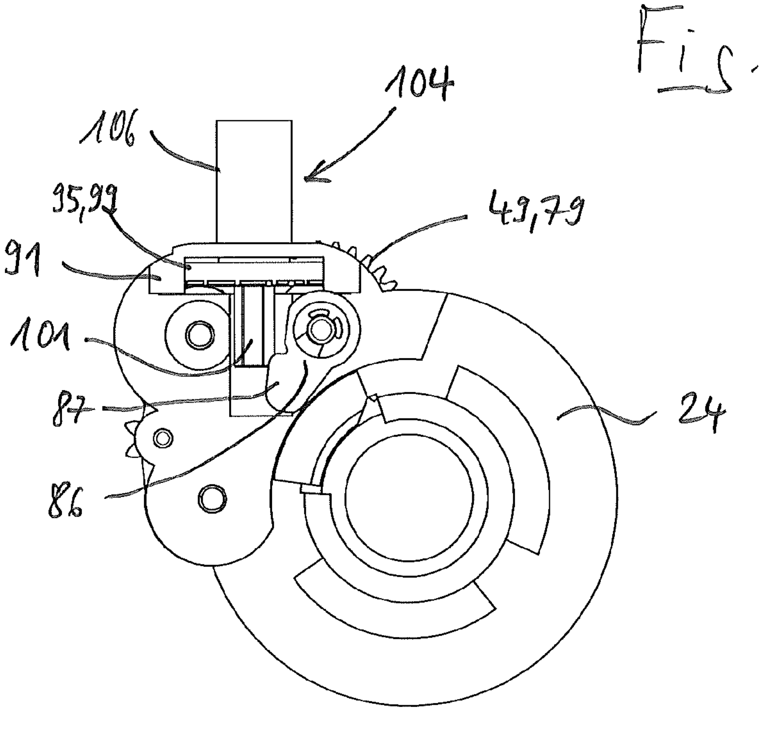
FIG. 11 illustrates a bottom view of an embodiment of the adjusting assembly with the calibration tool completely inserted for adjusting the counter.
Figure 12:
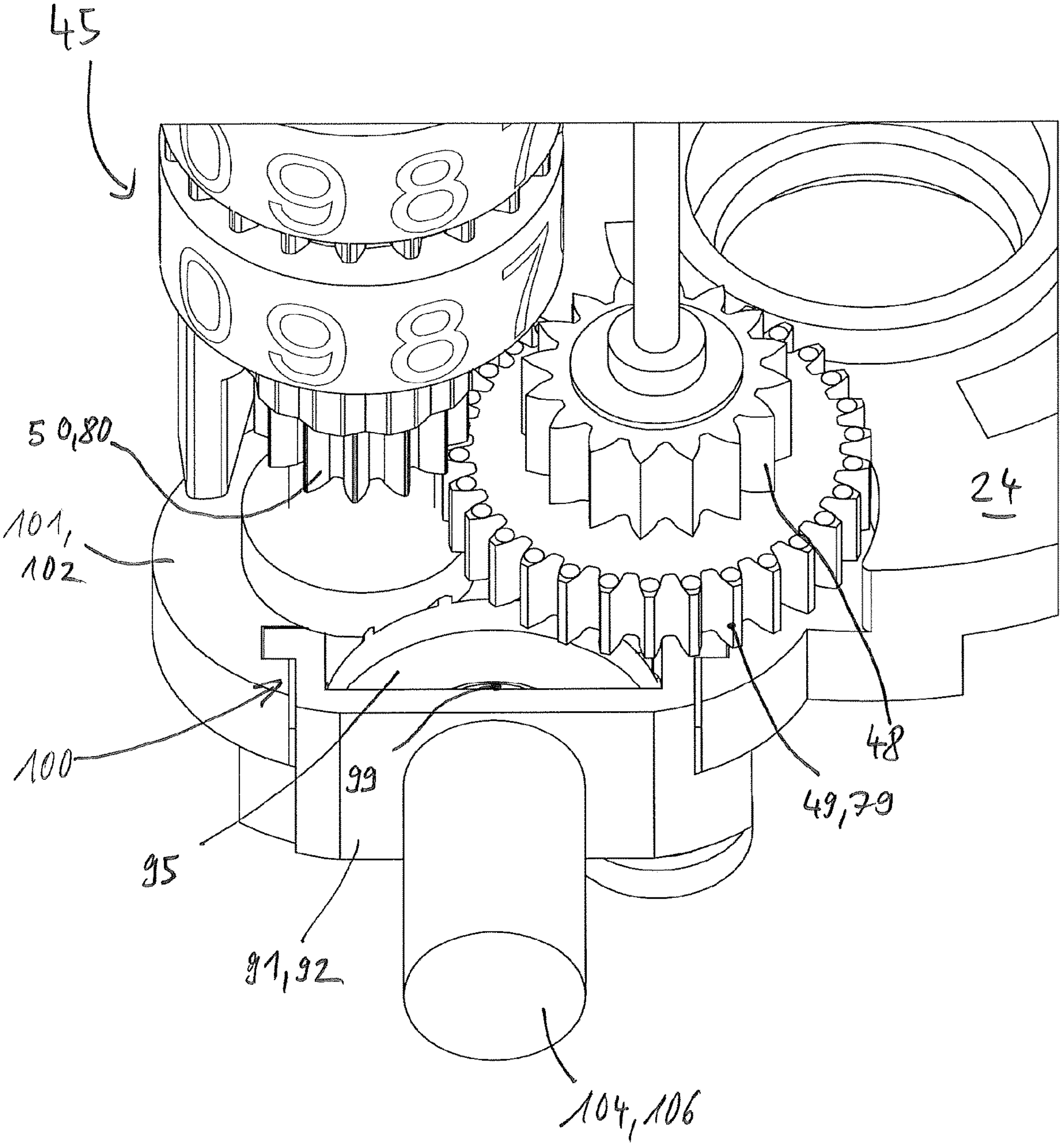
FIG. 12 illustrates a perspective view of the embodiment of FIG. 11.

According to FIGS. 6 and 9, the calibration tool 104 is inserted from the side into the housing opening 103 of the pipette 1 such that the shaft 105 engages in the tool engagement portion 97 of the first wheel 95. On account of the matching profiles of the shaft 105 and tool engagement portion 97, they can be interconnected for conjoint rotation. When the shaft 105 is inserted, it pivots the rotary lever 86. As a result, the first cam 83 of the cam mechanism 81 is displaced via the second cam 85 and the shaft 76 is translationally shifted upward slightly (cf. FIG. 7). As a result, the spur gear 49 is disengaged from the drive pinion 50 (cf. FIG. 10).

Finally, by further sliding the calibration tool 104 into the pipette 1, the handle 106 strikes the hollow cylinder 96 and the first wheel 95 is displaced further inward into the bearing body 92. The rotary lever 86 can also be pivoted further in the process (cf. FIG. 11). In the process, the first wheel 95 comes into contact with the second wheel 101, such that the setting of the counter 43 can be changed by rotating the calibration tool 104 (of FIG. 12).

Since the counter 45 is uncoupled from the adjusting sleeve 32 and the upper stop 25, the stroke system of the pipette 1 is not moved. However, the uncoupling of the counter 45 from the adjusting apparatus can also be used to move the stroke system by moving the adjusting sleeve 32.

After the calibration tool 104 has been pulled out, the spur gear 49 is brought back into engagement with the drive pinion 50 by means of the first spring apparatus 88 and the rotary lever 86 and the first wheel 95 are displaced into the position according to FIG. 8 by means of the cam mechanism 81. The pipette 1 has now been recalibrated and can be used for pipetting.

LIST OF REFERENCE SIGNS

1 Pipette
2 Housing
3 Lower housing part
4 Upper housing part
5 Main body
6 Attachment
7 Seat
8 Pipette tip
9 Displacement chamber
10 Connecting channel
11 Opening
12 Displacement element
13 Seal system
14 Plate
15 Spring apparatus
16 Sealing cap
17 Stroke rod
18 Control button
19 Spindle hole
20 Threaded spindle
21 Outer thread
22 Inner thread
23 Stroke body
24 First carrier
25 Upper stop
26 Stop element
27 Catch
28 Ribs
29 Grooves
30 Catch sleeve
31 Toothing
32 Adjusting sleeve
33 Adjusting ring
34 Second toothing
35 Third waling
36 Disc
37 Lower barrier
38 Upper barrier
39 Transmission shaft
40 Fourth toothing
41 Fifth toothing
42 Sixth toothing
43 Toothing
44 Second carrier
45 Counter
46 Counter roller shaft
47 Drive gear
48, 49 Spur gear
50 Drive pinion
51 Number wheel
52 Window
53 Cover
54 Holder
55 Outer thread
56 Inner thread
57 Third carrier
58 Lower stop
59 Upper edge
60 Overstroke spring
61 Floor
62 Spur gearbox
63 Gearbox
64 Shifting apparatus
65 Shift element
66 Ejector button
67 Ejector rod
68 Fastening shoulder
69 Ejector sleeve
70 Ejector spring
71 Snap connection
72 Top opening
73 Bottom opening
74 Coupling apparatus
75 Calibration apparatus
76 Shaft
77 Axis of rotation
78 First bearing
79 First gear
80 Second gear
81 Cam mechanism
82 First mechanism element
83 First cam
84 Second mechanism element
85 Second cam
86 Rotary lever
87 Cam-shaped end
88 First spring apparatus
89 Helical spring
90 Counter-bearing
91 Second bearing
92 Bearing body
93 First through-hole
94 Base
95 First wheel
96 Hollow cylinder
97 Tool engagement portion
98 Second through-hole
99 First friction wheel
100 Friction drive
101 Second wheel
102 Second friction wheel
103 Housing opening
104 Calibration tool
105 Shaft
106 Handle

The invention claimed is:

1. A pipette with an adjustable volume, the pipette comprising:

a housing comprising an outside surface extending from an upper end to a lower end;

at least one seat configured to releasably hold a pipette tip on the lower end of the housing, wherein the at least one seat defines an opening;

a displacement apparatus defining a displacement chamber comprising a displacement element configured to be displaced therein;

a connecting channel configured to connect the displacement chamber to the opening of the at least one seat;

a stroke rod coupled to the displacement element and configured to be displaced in a longitudinal direction relative to the housing in order to displace the displacement element within the displacement chamber;

a control button connected to the upper end of the stroke rod and projecting from the housing;

a stop element positioned on an outer circumference of the stroke rod, wherein the stop element comprises, an upper stop for the stop element, and a lower stop for the stop element, wherein the upper and lower stop elements limit a stroke of the stroke rod;

an adjusting apparatus configured to adjust a position of the upper stop in the housing;

a display apparatus configured to display a set dosing volume; and a coupling apparatus positioned between the adjusting apparatus and the display apparatus and configured to couple the adjusting apparatus to the display apparatus in an engaged state and configured to uncouple the adjusting apparatus from the display apparatus in a disengaged state wherein the coupling apparatus comprises, a shaft mounted in a first bearing within the housing and configured to be translationally displaceable in a direction of the axis of rotation, a first gear mounted to the shaft and configured to be rotated about an axis of rotation, a second gear configured to mesh with the first gear, a cam mechanism comprising a first mechanism element that is coupled to the shaft and a second mechanism element that is arranged in the housing, and a rotary lever connected to the first mechanism element and configured for conjoint rotation therewith, wherein the first gear is inhibited from shifting upward on the shaft and the first mechanism element is inhibited from shifting downward on the shaft, and wherein by pivoting the rotary lever, the shaft is configured to be translationally displaced via the cam mechanism and the first gear is configured to be disengaged from the second gear in order to uncouple the adjusting apparatus from the display apparatus.

2. The pipette according to claim 1, wherein the coupling apparatus is configured to be uncoupled and coupled from an outside of the housing.

3. The pipette according to claim 1, wherein the coupling apparatus is configured to be coupled and uncoupled by inserting a calibration tool into the housing from an opening defined in the outside surface of the housing.

4. The pipette according to claim 1, further comprising a calibration apparatus configured to change a setting of the display apparatus when the coupling apparatus is uncoupled.

5. The pipette according to claim 4, wherein the calibration apparatus is configured such that, when the coupling apparatus is uncoupled, the setting of the display apparatus can be changed by a calibration tool from an outside of the housing.

6. The pipette according to claim 5, wherein the calibration tool is configured to uncouple the adjusting apparatus from the display apparatus and to change the setting of the display apparatus.

7. The pipette according to claim 6, wherein the calibration tool is configured to be inserted into the opening of the housing to a first position in order to uncouple the coupling apparatus, and wherein the calibration tool is configured to be inserted into the opening of the housing to a second position and rotated in order to set the display apparatus.

8. The pipette according to claim 1, wherein the first mechanism element is a first cam, and wherein the second mechanism element is a second cam.

9. The pipette according to claim 1, wherein the rotary lever is configured to be pivoted by inserting a calibration tool through a housing opening of the housing.

10. The pipette according to claim 1, further comprising:

a counter-bearing arranged in the housing; and a first spring apparatus arranged between the shaft and the counter-bearing, wherein the first spring apparatus presses the shaft into a position such that the first gear meshes with the second gear, and wherein the first gear is configured to be disengaged from the second gear when the first spring apparatus moves the shaft out of the position.

11. A pipette with an adjustable volume, the pipette comprising:

a housing comprising an outside surface extending from an upper end to a lower end;

at least one seat configured to releasably hold a pipette tip on the lower end of the housing, wherein the at least one seat defines an opening;

a displacement apparatus defining a displacement chamber comprising a displacement element configured to be displaced therein;

a connecting channel configured to connect the displacement chamber to the opening of the at least one seat;

a stroke rod coupled to the displacement element and configured to be displaced in a longitudinal direction relative to the housing in order to displace the displacement element within the displacement chamber;

a control button connected to the upper end of the stroke rod and projecting from the housing;

a stop element positioned on an outer circumference of the stroke rod, wherein the stop element comprises, an upper stop for the stop element, and a lower stop for the stop element, wherein the upper and lower stop elements limit a stroke of the stroke rod;

an adjusting apparatus configured to adjust a position of the upper stop in the housing;

a display apparatus configured to display a set dosing volume;

a coupling apparatus positioned between the adjusting apparatus and the display apparatus and configured to couple the adjusting apparatus to the display apparatus in an engaged state and configured to uncouple the adjusting apparatus from the display apparatus in a disengaged state, wherein the coupling apparatus is further configured to be coupled and uncoupled by inserting a calibration tool into the housing from an opening defined in the outside surface of the housing; and a calibration apparatus comprising:

a first wheel accessible from outside the housing and mounted in a second bearing within the housing and configured to be rotatable about an axis of rotation and further configured to be translationally displaceable in a direction of the axis of rotation; and a second wheel configured to contact the first wheel and couple to the display apparatus, wherein the second wheel is rotated as a result of rotating the first wheel, and wherein the rotation of the second wheel changes a setting of the display apparatus.

12. The pipette according to claim 11, wherein the first wheel is configured to contact the second wheel by inserting the calibration tool into the housing, and wherein the first wheel and the second wheel are configured to be rotated by rotating the calibration tool.

13. The pipette according to claim 12, wherein the first wheel is a first friction wheel of a friction drive and the second wheel is a second friction wheel of the friction drive.

14. The pipette according to claim 13, further comprising a first spring apparatus is configured to push the first wheel away from the second wheel until the first wheel contacts the second bearing.

15. The pipette according to claim 14, wherein the coupling apparatus and a calibration apparatus are configured to be actuated by the calibration tool, wherein the calibration tool comprises, a shaft comprising a profile adapted to a tool engagement portion of the first wheel, and a handle connected to the shaft, wherein a rotary lever is configured to be pivoted as a result of the shaft being introduced into the opening of the housing, wherein further insertion of the shaft into the opening is configured to bring the first wheel into frictional connection with the second wheel, and wherein rotation of the calibration tool acts to rotate the first wheel, which in turn rotates the second wheel.

16. A set comprising:

a pipette with an adjustable volume, comprising:

a housing comprising an outside surface extending from an upper end to a lower end;

at least one seat configured to releasably hold a pipette tip on the lower end of the housing, wherein the at least one seat defines an opening;

a displacement apparatus defining a displacement chamber comprising a displacement element configured to be displaced therein;

a connecting channel configured to connect the displacement chamber to the opening of the at least one seat;

a stroke rod coupled to the displacement element and configured to be displaced in a longitudinal direction relative to the housing in order to displace the displacement element within the displacement chamber;

a control button connected to the upper end of the stroke rod and projecting from the housing;

a stop element positioned on an outer circumference of the stroke rod, wherein the stop element comprises, an upper stop for the stop element, and a lower stop for the stop element, wherein the upper and lower stop elements limit a stroke of the stroke rod;

an adjusting apparatus configured to adjust a position of the upper stop in the housing;

a display apparatus configured to display a set dosing volume;

a coupling apparatus positioned between the adjusting apparatus and the display apparatus and configured to couple the adjusting apparatus to the display apparatus in an engaged state and configured to uncouple the adjusting apparatus from the display apparatus in a disengaged state; and a calibration tool comprising:

a shaft having a profile adapted to a tool engagement portion of a first wheel; and a handle that is non-rotatably connected to the shaft, wherein a rotary lever is configured to be pivoted by the shaft being inserted into the opening of the housing to a first positon, wherein insertion of the shaft further to a second position brings the first wheel into frictional connection with a second wheel, and wherein rotation of the calibration tool acts to rotate the first wheel, which causes rotation of the second wheel.

17. The set according to claim 16, wherein the coupling apparatus is configured to be uncoupled and coupled from an outside of the housing.

18. The set according to claim 16, wherein the coupling apparatus is configured to be coupled and uncoupled by inserting the calibration tool into the housing from an opening defined in the outside surface of the housing.

19. The set of claim 16, wherein the rotary lever is configured to be pivoted by inserting the calibration tool through a housing opening of the housing.

20. The set of claim 16, further comprising a calibration apparatus that is configured such that, when the coupling apparatus is uncoupled, the setting of the display apparatus can be changed by the calibration tool from an outside of the housing.

* * * * *